(12) United States Patent
Smirnov et al.

(10) Patent No.: US 6,347,256 B1
(45) Date of Patent: Feb. 12, 2002

(54) MANUFACTURING PROCESS MODELING TECHNIQUES

(75) Inventors: Yuri V. Smirnov, Palo Alto; Phillip C. Nelson, San Jose; Jeffrey B. Winner, Los Altos; Yuh-Wen Soung, Saratoga; John L. Flight, Sunnyvale, all of CA (US)

(73) Assignee: printCafe System, Inc., Pittsburgh, PA (US)

( * ) Notice: Subject to any disclaimer, the term of this patent is extended or adjusted under 35 U.S.C. 154(b) by 0 days.

(21) Appl. No.: 09/184,776

(22) Filed: Nov. 2, 1998

(51) Int. Cl.[7] .............................................. G06F 19/00
(52) U.S. Cl. ......................................... 700/100; 700/97
(58) Field of Search .......................... 700/99–103, 106, 700/107, 108, 214; 705/1, 7; 340/825; 702/3; 318/468; 703/100, 102

(56) References Cited

U.S. PATENT DOCUMENTS

| | | | |
|---|---|---|---|
| 3,581,072 A | 5/1971 | Nymeyer ...................... 700/90 |
| 3,703,006 A | 11/1972 | Sharma ........................ 700/97 |
| 3,703,725 A | 11/1972 | Gomersall et al. .............. 705/1 |
| T918,004 I4 | 1/1974 | Chappell et al. ................ 717/2 |
| 3,905,045 A | 9/1975 | Nickel ......................... 382/130 |
| 3,930,251 A | 12/1975 | Salava et al. ................ 345/467 |
| 3,988,570 A | 10/1976 | Murphy et al. .............. 235/382 |
| 4,007,362 A | 2/1977 | Sindermann ................ 707/507 |
| 4,017,831 A | 4/1977 | Tieden et al. .......... 340/825.17 |

(List continued on next page.)

FOREIGN PATENT DOCUMENTS

| | | |
|---|---|---|
| EP | 0 517 953 A2 | 12/1992 |
| JP | 09034953 | 2/1997 |
| JP | 11110451 | 4/1999 |
| WO | WO 96/10793 | 4/1996 |
| WO | WO 96/16365 | 5/1996 |
| WO | WO 97/07472 | 2/1997 |
| WO | WO 97/28506 | 8/1997 |
| WO | WO 97/29441 | 8/1997 |
| WO | WO 97/31322 | 8/1997 |

OTHER PUBLICATIONS

"Workflow Management Coalition Terminology & Glossary", Document No. WFMC–TC–1011, Document Status—Issue 2.0, Jun. 1996, (55 pg.).

"Workflow Management Coalition, The Workflow Reference Model", Document No. TC00–1003, Document Status—Issue 1.1, Nov. 29, 1994, (46 pg.).

"Workflow Management Coalition, Workflow Security Considerations—White Paper", Document No. WFM-C–TC–1019, Document Status—Issue 1.0, Feb. 1998, (15 pg.).

(List continued on next page.)

Primary Examiner—William Grant
Assistant Examiner—Kidest Bahta
(74) Attorney, Agent, or Firm—Blakely, Sokoloff, Taylor & Zafman

(57) ABSTRACT

A directed graph includes a first number of state nodes and a second number of task nodes. The task nodes are interconnected with the state nodes to define one or more paths through the directed graph, each of the paths including an alternating series of one or more of the state nodes and one or more of the task nodes. Thus, any predecessor state node in one of the paths represents a precondition for a subsequent task node along that path. Further, any following state node of that task node represents a result of applying one or more actions that correspond to the task node. The state nodes may be virtual representations of inventory items of a manufacturing environment. Thus, collectively the state nodes may define a bill of materials for the manufacturing environment. Similarly, the task nodes may each define a virtual representation of a manufacturing process within the manufacturing environment. In other words, the task nodes may collectively define routings for the manufacturing environment.

17 Claims, 5 Drawing Sheets

Fig. 2

U.S. PATENT DOCUMENTS

| Patent No. | | Date | Inventor | Class |
|---|---|---|---|---|
| 4,231,096 | A | 10/1980 | Hansen et al. | 345/441 |
| 4,400,783 | A | 8/1983 | Locke, Jr. et al. | |
| 4,433,426 | A | 2/1984 | Forster | 345/441 |
| 4,449,186 | A | 5/1984 | Kelly et al. | 705/5 |
| 4,468,750 | A | 8/1984 | Chamoff et al. | 709/251 |
| 4,475,756 | A | 10/1984 | Federico et al. | 294/51 |
| 4,484,522 | A | 11/1984 | Simeth | 101/248 |
| 4,495,582 | A | 1/1985 | Dessert et al. | 700/124 |
| 4,578,768 | A | 3/1986 | Racine | 700/293 |
| 4,584,648 | A | 4/1986 | Dlugos | 705/407 |
| 4,601,003 | A | 7/1986 | Yoneyama et al. | 345/351 |
| 4,648,023 | A | 3/1987 | Powell | 364/156 |
| 4,796,194 | A | 1/1989 | Atherton | 700/103 |
| 4,839,829 | A | 6/1989 | Freedman | 345/329 |
| 5,016,170 | A | 5/1991 | Pollalis et al. | 364/401 |
| 5,053,970 | A | 10/1991 | Kurihara et al. | 364/468 |
| 5,229,948 | A | 7/1993 | Wei et al. | 700/99 |
| 5,233,533 | A | 8/1993 | Edstrom et al. | 364/468 |
| 5,278,750 | A | 1/1994 | Kaneko et al. | 364/401 |
| 5,287,194 | A | 2/1994 | Lobiondo | 358/296 |
| 5,291,394 | A | 3/1994 | Chapman | 364/401 |
| 5,291,397 | A | 3/1994 | Powell | 700/97 |
| 5,406,476 | A | 4/1995 | Deziel, Jr. et al. | 364/402 |
| 5,432,887 | A | 7/1995 | Khaw | 700/96 |
| 5,436,843 | A * | 7/1995 | Kamejima et al. | 700/95 |
| 5,463,555 | A | 10/1995 | Ward et al. | 700/96 |
| 5,504,568 | A | 4/1996 | Saraswat et al. | 355/308 |
| 5,557,367 | A | 9/1996 | Yang et al. | 355/202 |
| 5,574,640 | A | 11/1996 | Sycara et al. | 364/401 |
| 5,592,602 | A | 1/1997 | Edmunds et al. | 395/174 |
| 5,729,790 | A | 3/1998 | Conley et al. | 399/77 |
| 5,734,837 | A | 3/1998 | Flores et al. | 395/207 |
| 5,748,899 | A | 5/1998 | Aldrich | 395/200 |
| 5,754,857 | A | 5/1998 | Gadol | 395/680 |
| 5,757,669 | A | 5/1998 | Christie et al. | 364/514.006 |
| 5,765,139 | A | 6/1998 | Bondy | 705/8 |
| 5,768,506 | A | 6/1998 | Randell | 395/200 |
| 5,778,364 | A | 7/1998 | Nelson | 707/6 |
| 5,794,207 | A | 8/1998 | Walker et al. | 705/1 |
| 5,946,663 | A * | 8/1999 | Tanaka et al. | 705/8 |
| 5,983,195 | A * | 11/1999 | Fierro | 705/10 |
| 6,058,334 | A * | 5/2000 | Shapiro | 700/97 |
| 6,088,626 | A * | 7/2000 | Lilly et al. | 700/100 |

OTHER PUBLICATIONS

"Workflow Management Coalition, Workflow Client Application (Interface 2), Application Programmng Interface (WAPI) Specification", Document No. WFMC–TC–1009, Oct. 1997, Version 2.0e (Beta), (178 pg.).

PCT International Search Report; International Application No. PCT/US 99/24177; Apr. 6, 2000.

PCT International Search Report; International Application No. PCT/US 99/24178; Apr. 6, 2000.

PCT International Search Report; International Application No. PCT/US 99/24381; Feb. 29, 2000.

PCT International Search Report; International Application No. PCT/US 99/24193; Feb. 5, 2000.

PCT International Search Report; International Application No. PCT/US 99/24131 Dec. 4, 1998.

PCT International Search Report; International Application No. PCT/US 24132; Feb. 22, 2000.

"A Knowledge Based, Integrated Process Planning and Scheduling System for Document Preparation"; Roger M. Kerr; XP–000892975; pp. 497–506.

"Heuristic Knowledge Representation of Production Scheduling: An Integrated Modeling Approach"; Sung Joo Park and Jong Woo Kim; XP–000893055; pp. 325–339.

XP–002130869; 1 page.

"From Contemporary Workflow Process Automation to Adaptive and Dynamic Work Activity Coordination and Collaboration"; Amit Sheth; XP–002135795 pp. 24–27.

Towards Evolutionary and Adaptive Workflow Systems—Infrastructure Support Based on Higher–Order Object Nets and CORBA; Ingo ClaBen, Herbert Weber and Yanbo Han; XP–002135793; pp. 300–308.

"A Fine Mes"; State of the Art; Jim Esch; Petersborough, NH, US; No. 12; pp. 67, 68, 70, 74, 75.

"Simulation System for Real–Time Planning, Scheduling, and Control"; Glenn R. Drake and Jeffrey S. Smith; pp. 1083–1090.

"Electronic Contracting with COSMOS–How To Establish, Negotiate and Execute Electronic Contracts on the Internet"; F. Griffel, M. Boger, H. Weinrcich, W. Lamersdorf and M. Merz; XP–002129707; pp. 46–55.

* cited by examiner

MANUFACTURING PROCESS MODELING TECHNIQUES

FIELD OF THE INVENTION

The present invention involves the creation of virtual representations of manufacturing processes and, in particular, homogeneous manufacturing environments that may be associated with on-demand manufacturing processes.

BACKGROUND

Within manufacturing environments, the questions of deciding what products to produce (assuming the environment is capable of producing more than a single product), when to produce them, how much of each to produce and whether to accept new orders for different products must all be weighed against the realities of the various constraints imposed upon and within the environment. For example, a given manufacturing environment that is currently operating at or near its maximum capacity should probably not be weighed down with additional order commitments that require immediate response. On the other hand, a manufacturing environment that is operating with excess capacity is capable of accepting new orders, but it may not be apparent how many orders are capable of being fulfilled within a specified time frame.

The process of job order scheduling, which is at the heart of the above dilemma, typically proceeds along a product structure in order to determine which components must be produced and/or purchased and when. This process is time consuming whenever the number of unique orders grows, which is a typical situation in on-demand manufacturing environments. This problem is exacerbated by the historical fashion in which product structures have been separated into bills of material and routings. Those of ordinary skill in the art have been unwilling to deviate from product structures that segregate these descriptions of a manufacturing process. See, Eliyahu M. Goldratt, The Haystack Syndrome, Ch. 27, p. 169 (1990) for a discussion of classical manufacturing modeling techniques and the reasons behind the inertial unwillingness to accept new modeling approaches in this field. As a result, scheduling in on-demand manufacturing environments remains a complex and time-consuming process.

Goldratt recognized that a product structure that could represent both bills of material and routings may allow for a reduction in the amount of computer processing time for successful scheduling operations. Id. at pp. 173–174. However, Goldratt failed to describe any manner for accomplishing this goal. At best then, Goldratt seems to have appreciated the problem but has left the development of a feasible solution to others.

SUMMARY OF THE INVENTION

The present invention provides a solution to the scheduling problem described above. Briefly, a model that integrates one or more bills of materials with one or more routings for a manufacturing environment is described. The model is constructed as an alternating structure of state nodes and task nodes. This structure implicitly defines the logical relationships between the nodes without requiring additional semantics. Each route through the model defines a bill of materials and its associated bill of resources, allowing for scheduling operations within the manufacturing environment.

In one embodiment, a directed graph includes a first number of state nodes and a second number of task nodes. The task nodes are interconnected with the state nodes to define one or more paths through the directed graph, each of the paths including an alternating series of one or more of the state nodes and one or more of the task nodes. Thus, any predecessor state node in one of the paths represents a precondition for a subsequent task node along that path. Further, any following state node of that task node represents a result of applying one or more manufacturing processes that correspond to the task node.

The state nodes may be virtual representations of inventory items of a manufacturing environment. Thus, collectively the state nodes may define one or more bills of material for the manufacturing environment. Similarly, the task nodes may each define a virtual representation of a manufacturing process within the manufacturing environment. In other words, the task nodes may collectively define one or more bills of resources for the manufacturing environment. In some cases, the bill of resources may be restricted to reusable resources, while in other cases both reusable and consumable resources may be represented.

In a further embodiment, a method of modeling a manufacturing environment is provided. The method provides for representing a final product of the manufacturing environment with a first state node of a directed graph. In addition, each manufacturing process required in the production of the final product and the corresponding preconditions thereto and results produced thereby may be represented as a number of corresponding task nodes and state nodes. In general, the task nodes may represent the manufacturing processes of the manufacturing environment. The state nodes may represent the preconditions to the task nodes and the results produced thereby. As described in greater detail below, the task nodes and the state nodes may be arranged within the directed graph such that inputs to each of the task nodes represent required states and outputs of each of the task nodes represent alternative states produced thereby. Within this arrangement, any state node, except possibly a start node, may represent the output of one or more of the manufacturing processes represented by one or more of the task nodes.

As will be discussed below, in some cases the task nodes may represent manufacturing processes which require reusable resources from the manufacturing environment, in other cases the they may not.

Within the directed graph, the state nodes may be arranged in a hierarchy so as to comprise one or more bills of material for the manufacturing environment. Further, the task nodes alternate with the state nodes along each of a number of paths through the directed graph, each path defines a route along which the final product may be generated.

In yet another embodiment, a computer assisted scheduling system is provided. The system includes a model of a real-world manufacturing environment. The model may be arranged as a directed graph and may include a first number of state nodes and a second number of task nodes interconnected therein to define one or more paths through the directed graph. Each of the paths may include an alternating series of one or more of the state nodes and one or more of the task nodes. In this arrangement, any predecessor state node in one of the paths represents a precondition for a subsequent task node along that path. Likewise, any state node following a task node represents a result of applying one or more manufacturing processes which correspond to the task node. The system further includes a scheduler configured to determine which of the routes through the direct graph to use to manufacture the product.

The production automation system that incorporates the described model may be configured to receive updates from the real-world manufacturing environment, where these updates represent changes in the manufacturing environment. For example, the changes may represent completed tasks and/or changes in the availability of one or more resources used by one or more of the task nodes.

Further details of these and other embodiments will be discussed below, however, it should be remembered that these are merely examples of implementations of the present invention.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
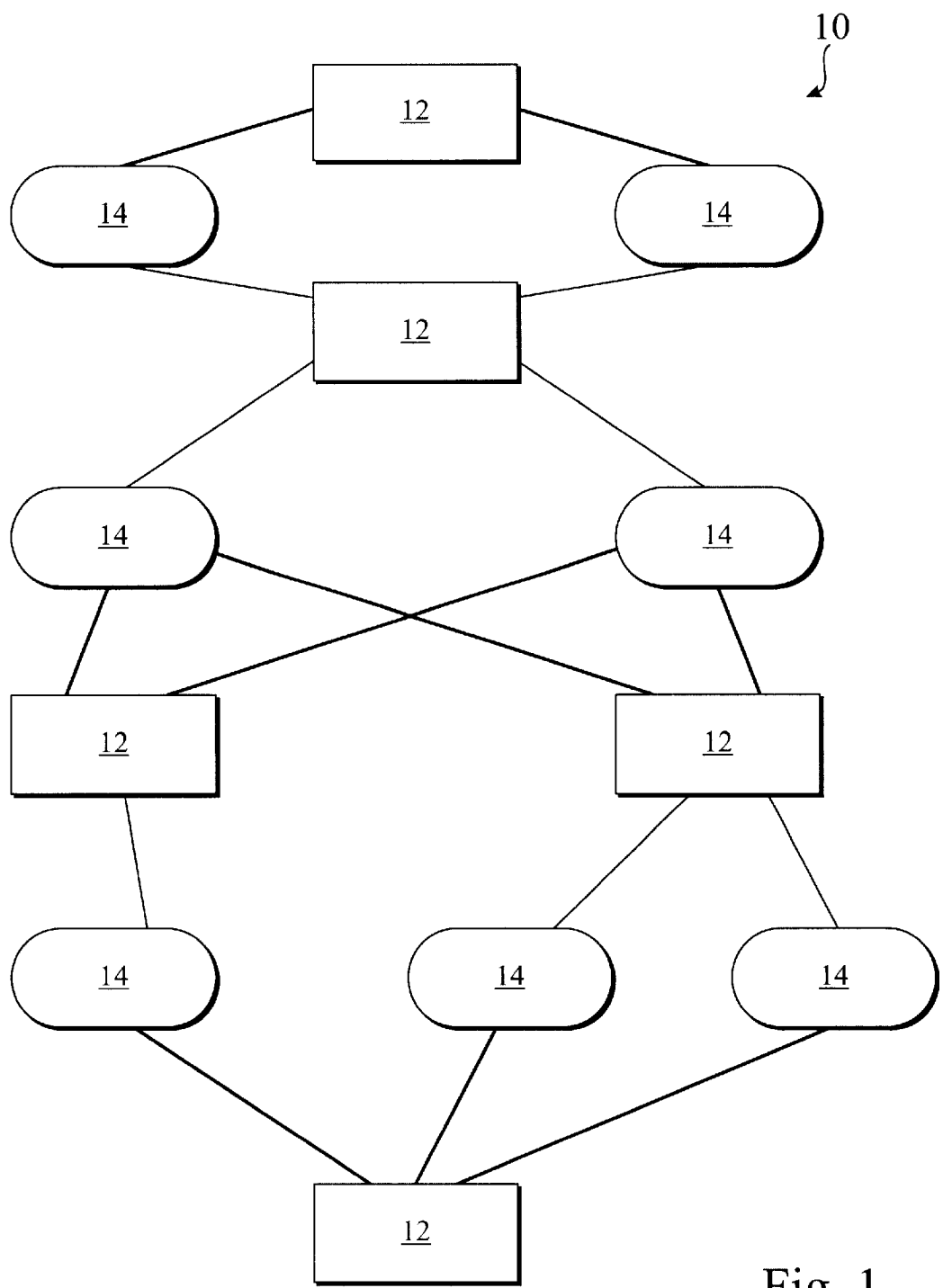
FIG. 1 illustrates a model having task nodes and state nodes organized according to an embodiment of the present invention.

A model that may find application for representing a manufacturing environment is described herein. Many of the techniques to be discussed will make reference to a manufacturing environment (and, in particular, a print shop environment) in which similar types of products are produced in similar ways. However, upon review of this specification, those of ordinary skill in the art will recognize that the present model may find application in a variety of environments. Therefore, in the following description the illustrated embodiments should be regarded as examples only, and should not be deemed to limit the scope of the present invention.

Before describing the model in detail, it is helpful to present an overview. Briefly, the model may be regarded as a directed graph made up of state nodes and task nodes. The task nodes and state nodes are interconnected with one another in such a way so as to define one or more paths through the directed graph, with each path defining a route to a completed product. Each of the paths includes an alternating series of one or more of the state nodes and one or more of the task nodes. In some cases, two or more of the paths may share one or more task nodes and/or state nodes.

Within the alternating structure of state nodes and task nodes, a predecessor state node in one of the paths represents a precondition for a subsequent task node along that path. Similarly, a state node following a preceding task node along the one of the paths represents a result of applying one or more actions (e.g., manufacturing processes or sub-processes) that correspond to that task node. State nodes and task nodes may be chosen to represent any appropriate level of item or material (in the case of state nodes) or process (in the case of task nodes). In one embodiment, for example, task nodes are introduced into the model to represent significant steps in the processing of materials in the manufacturing environment.

The manufacturing processes or sub-processes represented by the individual task nodes may correspond to on-site or off-site processes (e.g., where subcontractors or remote manufacturing facilities may be employed). In general then, each task node represents a transformation process for an item or material from a preceding state to a following state. The present model is flexible in that multiple task nodes may be used to represent multiple ways of transforming the item or material from the preceding state to the following state. In other words, different actions or processes (whether performed by humans, machines or both) that lead to the same result may be represented by different task nodes, or, if preferable, by the same task node (e.g., depending upon the granularity of the model chosen to represent a particular manufacturing environment). Indeed, because of this flexibility, the model may be hierarchically arranged such that each task node may be expanded to its own directed graph representation using the model structure described herein.

The state nodes may be virtual representations of inventory items of a manufacturing environment. Thus, collectively each of the state nodes along a particular path may define a bill of materials for a manufacturing environment. The task nodes may define virtual representations of various manufacturing processes. Thus, collectively the task nodes may define routings for the manufacturing environment, each routing representing a bill of resources for a particular path. In some cases, the task nodes may identify reusable resources for the manufacturing processes associated with the task nodes, or, alternatively, both reusable and consumable resources.

Another interesting feature of the present model is the manner in which the logical semantics of the routes defined by the directed graph are implicit in the model structure itself. For example, all inputs to a task node implicitly represent logical AND requirements. Because of the hierarchy defined by the directed graph, it is axiomatic that the action (or actions) associated with a particular task node cannot be performed until all of the associated materials or items represented by the state nodes which feed that task node are available. The model structure itself makes this logical argument explicit, without having to introduce additional attributes when defining the task node. All inputs to a state node, on the other hand, represent logical ORs. That is, the inventory item or material defined by a particular state node may be produced by any of the manufacturing processes associated with any immediate predecessor task nodes. Again, the structure of the present model itself defines these relationships, without requiring any additional defining attributes for a state node.

To better understand the model that is an embodiment of the present invention, consider a hypothetical print shop. The print shop includes a number of machines, which are used in the printing of books and similar articles. For example, the print shop includes a number of printers, each of which is capable of producing a document, printed on paper or another material, from a computer-readable file (e.g., a PostScript™ file). In addition, the print shop includes special printers for producing covers. Besides printers, the print shop may include machines for binding the various documents and covers together and other machines for cutting the resulting products to size. In general, all of the products (e.g., books) produced by the print shop are produced using similar processes, but any of the end products may be created in any of a variety of ways. For example depending upon the availability of resources (e.g., the printing, binding and cutting machines) and materials (e.g., paper and ink for the printers, cover stock, etc.) one route may be chosen over another. Thus, the print shop is an example of a homogeneous manufacturing environment.

Consider now the following scenario. A number of jobs, perhaps each at various stages of completion and each having certain deadlines for completion, are waiting to be processed. Each job has an associated cost of completion and each completed job has an associated value. Any job not completed on time carries an associated penalty, which may or may not be linear in nature. The task facing the owner of the hypothetical print shop then, is to decide how best to employ the available resources and materials to complete the existing job requests within their designated time frames, while maximizing the derived values from the jobs at the lowest cost. To this task can be added the complication that the print shop owner would like to be able to accept new orders, each of which will carry its own completion time deadlines, costs and values.

To assist the print shop owner in these and other matters, the model illustrated in FIG. 1 is introduced. Model 10 represents the print shop environment in terms of its bill of materials and bill of resources. It should be appreciated that model 10 may be instantiated as a computer-readable file and may thus be regarded as a virtual representation of the bill of materials and bill of resources. Importantly, the manner in which the inventory items that make up the bill of materials are interconnected to tasks that make up the bill of resources implicitly defines the workflow in the print shop.

Before going further, it is helpful to define some terms. A bill of materials, as used herein, is a summary that defines a product structure. More than merely a parts list, a bill of materials provides some idea of how a product is assembled from its constituent parts. In some cases, it may indicate the types and quantities of subassemblies required to produce the product. Although the bill of materials shows the assembly chain for the product, it does not provide any information as to how or when the assembly is to be completed. A bill of resources on the other hand, is a precise list of the available reusable resources that may be employed to assemble the product. For example, the various machines that are located on the print shop floor comprise at least a portion of the print shop's bill of resources. In some cases, outside vendors and suppliers may be part of the bill of resources.

Another concept that is important to understand is the idea of a production plan. The production plan is a detailed set of instructions for how to assemble the product of interest. The plan specifies the order in which various resources are employed to produce the items on the bill of materials and, hence, acts as assembly instructions for the product. Model 10 is unique in that it integrates a bill of materials with a bill of resources to provide a logical flow structure that may be easily used to identify available process plans. That is, one or more process plans may be regarded as instances of the model.

Returning to FIG. 1, model 10 includes a collection of state nodes 12 and task nodes 14. The nodes 12 and 14 are interconnected in such a fashion so as to form a state transition graph. That is, task nodes 14 define processes or actions by which predecessor state nodes 12 are transformed to successor state nodes 12. The processes or actions defined by the task nodes 14 are those associated with the available resources of the manufacturing or other process defined by model 10 (e.g., the print shop machines and/or their associated operators for the above print shop example). Thus, in model 10, the state nodes 12 represent intermediate states (or milestones), which have been identified as comprising the bill of materials. All state nodes 12 are the outcome or result of a task node 14.

In model 10, state nodes 12 and task nodes 14 always appear in alternating order as one proceeds along a path through the model. Paths are defined as complete routes to a final product and therefore may be regarded as workflows or production plans. Separating the state nodes 12 and task nodes 14 in this fashion provides clarity in the logical semantics of parallel paths. For example, all inputs to a task node 14 represent logical AND requirements. That is, the action associated with a given task node 14 cannot be performed until all of the associated inventory items represented by the state nodes 12 which feed the task node 14 are available. All inputs to a state node 12, on the other hand, represent logical ORs. That is, the inventory item defined by a given state node 12 may be produced by any of the actions associated with any immediate predecessor task node 14.

In model 10, state nodes are represented using rectangles while task nodes are represented using ovals. The logical flows that interconnect the nodes are depicted with thick lines representing logical ANDs and thin lines representing logical ORs.

Those of ordinary skill in the art will appreciate that model 10 may exist as a virtual representation of the associated manufacturing environment, for example, as may be present in a computer system, a computer-readable storage medium or other database environment. In some cases, model 10 may exist in various component parts in one or more locations of a distributed processing environment. Regardless of its physical location or makeup, however, it should be appreciated that model 10 may be continuously updated with information regarding the real-world manufacturing environment that it represents. In this way, as resources are taken off line or added, model 10 is available to identify new production plans.

Within the virtual representation, a task node 14 may be defined with various attributes. For example, each task node may have an associated resource that actually performs the actions represented by the task node. In addition, each task node 14 will have an associated capacity, which may represent the resource's required time for completing the task. Such information may become useful for identifying and avoiding bottlenecks in the manufacturing environment when using model 10 to plan/schedule multiple jobs. The task nodes 14 also have defined predecessors, which in this case are represented by the state nodes 12. As indicated above, however, the attribute list need not include semantic definitions, because the structure of model 10 is such that the node type inherently defines the logical semantics. Other attributes relating to the rules and variants associated with each task node 14 may also be included.

State nodes 12 may also have associated attributes. Among these may be an indication of predecessor and/or successor actions/events. Other rules may also form attributes. In general, all nodes of model 10 will have associated rules and each rule may be associated with a successor node of the model. During processing of a real world job in the manufacturing environment represented by model 10, after an action associated with a node has been completed, all rules of the node may be evaluated. If a rule is satisfied, the job may be passed to the successor node associated with the rule. If more than one rule is satisfied, the job may be passed to multiple successor nodes, as represented by the existence of multiple parallel paths in the model 10.

Within this representation, each manufacturing process represented by a task node 14 requires certain resources to complete its associated task. These resources may be divided into materials, assets and information assets. Materials are those items which can be used only once (i.e., consumables) and are completely used up by the task that uses them. In the print shop environment, examples of materials include paper, toner (for the printers, etc.), etc. Assets are those resources that are not consumed by the processes that use them. Examples include the actual print machines, the physical plant, operators, etc. (i.e., assets are reusable resources). Both materials and assets may be represented in model 10 or this information may be represented separately. Information assets may be items such as ripped images, PostScript files, other digital files, etc. that are consumed but remain viable after such consumption. New information assets may be produced by tasks.

Figure 2:
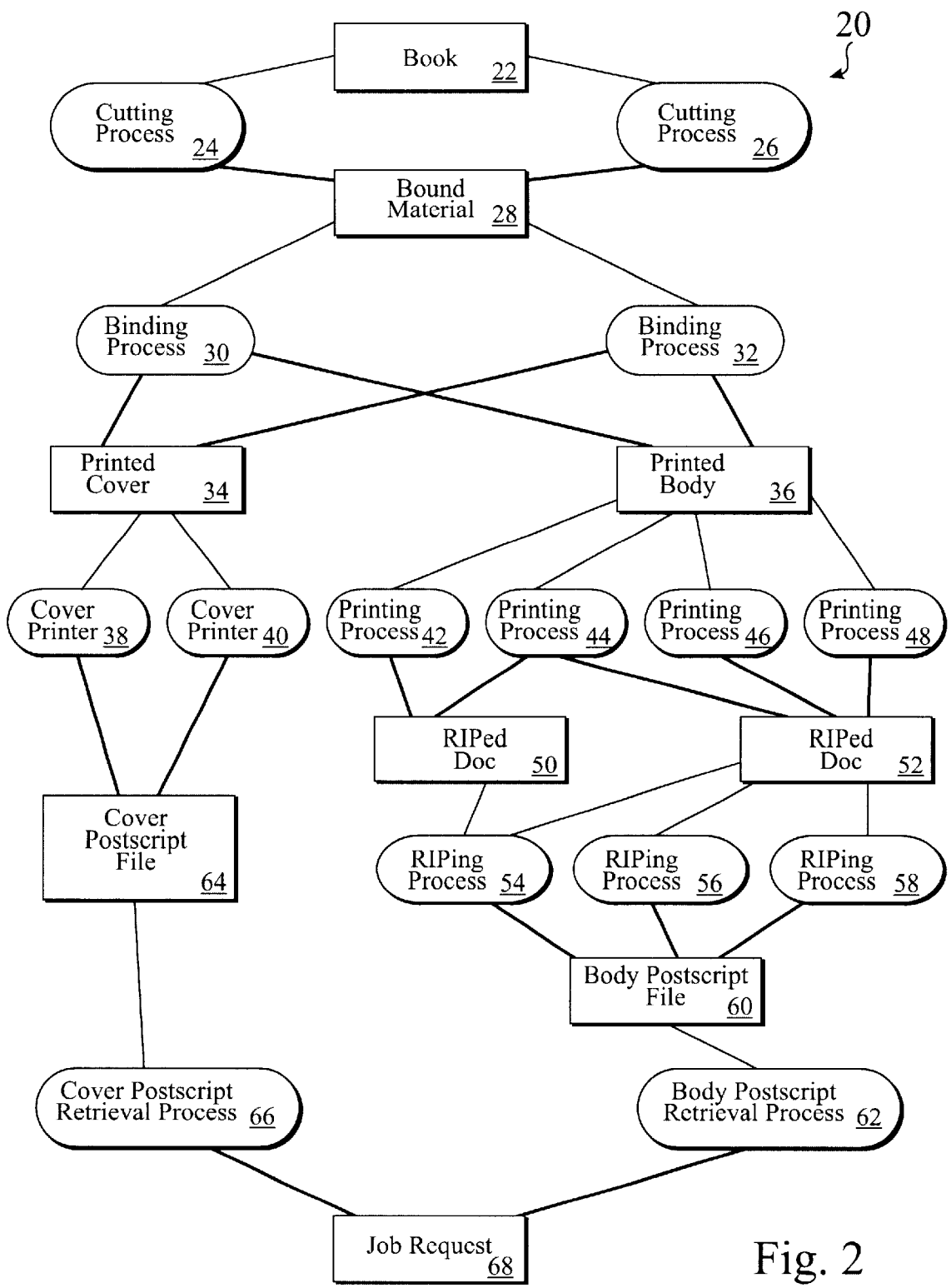
FIG. 2 illustrates a detailed model of a hypothetical print shop environment, which is one exemplary embodiment of the present invention.

FIG. 2 presents a fully detailed model 20 of the hypothetical print shop. Model 20 is created using a "top-down" approach, wherein the end product, book 22, is regarded as the outcome of the entire manufacturing process. Model 20 is illustrated using the state node/ task node representation discussed above, where inventory items which make up the bill of materials for a book 22 are represented using rectangles and manufacturing processes which act on the inventory items are represented using ovals. Similar logical flows to those discussed above are inherent in the node structure and are represented in model 20 with thick lines representing logical ANDs and thin lines representing logical ORs.

Having decided that book 22 represents the final state (i.e., the output of the print shop manufacturing environment), it is recognized that this state must be the result of some action. In the print shop hypothetical, a book is produced once it is cut to shape; thus, book 22 is the result of one of either of two cutting processes 24 or 26. Notice that model 20 accurately reflects the logical OR nature of these alternative processes.

Because all task nodes (by which cutting processes 24 and 26 are represented in model 20) represent actions that are employed on one or more items of a bill of materials, it follows that the inputs to cutting processes 24 and 26 must be represented by state nodes. In this case, before a book can be cut to size by either of cutting processes 24 or 26, some bound material 28 must exist. The bound material 28 is represented in model 20 by the predecessor state node to the task nodes associated with the two cutting processes. Notice that the logical AND requirement for the bound material is also represented in model 20, thus illustrating the need for the bound material 28 to exist before the cutting process may be commenced.

If bound material 28 is available, it follows that some binding process must have been applied. Thus, model 20 accommodates the act of binding with task nodes representing two hypothetical alternative binding processes 30 and 32. As shown, these processes act on the predecessor inventory items, namely printed cover 34 and printed body 36. Here, the body of the book 22 refers to all material included within the cover. The printed cover 34 and printed body 36 are represented using appropriate state nodes and the various logical combinations of these items, which may be acted upon by the two binding processes are also illustrated. It should be appreciated, however, that the very node definition will lead to the logical flow illustrated in model 20 and no additional rules need to be defined.

Both the printed cover 34 and the printed body 36 are the result of independent printing processes. For example, printed cover 34 may be produced by either of cover printing processes 38 or 40, while printed body 36 may be produced by any of printing processes 42, 44, 46 or 48. Thus, appropriate task node representing these various processes are introduced into model 20. Again, the node definition itself has provided an immediate indication of the logical paths available within the manufacturing process.

The printing processes 42, 44, 46 and 48 each act upon a ripped document, although some printing processes may only act upon certain types of ripped documents. In the hypothetical print shop environment, two types of ripped documents 50 and 52 may be produced, but each by independent ripping processes 54, 56 and 58. Thus, these individual inventory items are represented by state nodes assigned to the ripped documents 50 and 52 and the various ripping processes 54, 56 and 58 are represented using appropriate task node.

The ripping processes themselves act upon PostScript files 60, represented by an appropriate state node. The PostScript file 60 is produced in response to a retrieval process 62, such as loading a PostScript file.

For the cover, no ripping process is required; thus printed cover 34 is produced directly from a cover PostScript file 64. As for the body PostScript file, cover PostScript file 64 is retrieved by a retrieval process 66. The retrieval processes 62 and 66 are carried out in response to a job request 64.

Notice then that model 20 may be created by examining the prerequisites and/or preconditions that must exist in order to execute a particular task, and also determining the actions that are required to produce a particular inventory item. These prerequisites and actions are then combined in the logical hierarchy discussed above to form a single model in which the bill of materials (represented by the individual inventory items) and the bill of resources (represented by the collection of actions) are integrated with one another. This procedure may be applied to any manufacturing process, but is especially applicable to homogeneous manufacturing processes such as the print shop example, because a number of products may be produced using similar processes.

Although model 20 has not illustrated the integration of consumables, such integration is easily achieved. For example, consumables may be represented as predecessor state nodes to the tasks that consume them. Thus, any or all of the printing processes 42, 44, 46 and/or 48 may draw upon paper, toner and other materials in addition to the ripped documents. Such materials may be represented as state nodes similar to the ripped documents 50 and 52, with the exception that the state node would have to be defined to indicate its consumable status. Thus, in some embodiments, state nodes representing consumables may be implemented so that their available/not available status must be defined prior to execution of a subsequent task. Preferably, direct feedback from the manufacturing environment may be used to update this status in real time.

From the above, it should be apparent that when the present model is used to represent a real-world manufacturing environment, any route through the model to a completed product automatically provides a complete bill of materials and bill of resources for that product. Further, alternative routes (and, hence, alternative bills of materials and bills of resources) arc also provided. Thus, a scheduler may make use of the model to assist in the efficient employment of resources within the manufacturing environment. In essence, the scheduler will be required to perform route selection according to rules by which such routes may be chosen to achieve desirable or optimal results.

Figure 3:
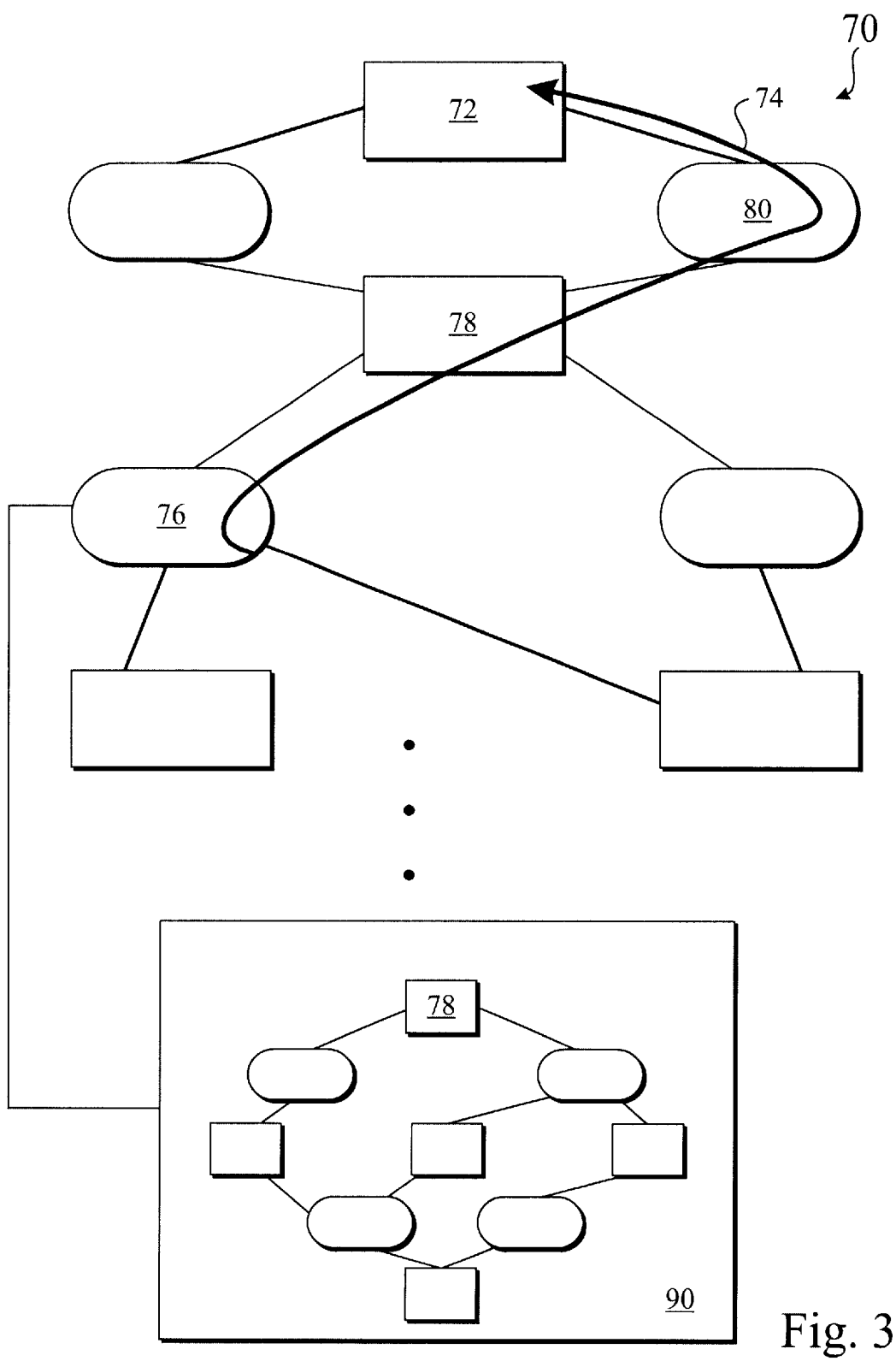
FIG. 3 illustrates an example of the hierarchical nature of a model having task nodes and state nodes organized according to an embodiment of the present invention.

As indicated above, an embodiment of the model may be hierarchical in nature in that one or more task nodes themselves may be further represented by other embodiments of the model. An example of this hierarchical nature is illustrated in FIG. 3. In the drawing, a model 70 is illustrated in part. Model 70 is a virtual representation of a manufacturing environment that produces product, as represented by state node 72. Notice that multiple routes arc defined by model 70, each route including its own state nodes (shown as rectangles) and task nodes (shown as ovals), some of which may be shared between routes. As explained above, these various routes each define bills of materials and bills of resources that may be used to produce the final product. A particular route is defined by path 74, which includes task node 76, state node 78 and task node 80. When the process represented by task node 80 operates on the item represented by state node 80, the product represented by state node 72 is produced.

Assume now that a manufacturer that subcontracts the work to be performed by the process represented by task node 76 uses model 70. For the manufacturer, this process is a self-contained unit that ultimately delivers the item represented by state node 78. The manufacturer need not be concerned with the manner in which the item represented by state node 78 is actually produced. Thus model 70 need only include a representation of the process used to deliver that item (i.e., the granularity of task node 76 is such that an entire subcontracted manufacturing process is represented).

The subcontractor employed by the manufacturer, however, is very much concerned with the manufacturing process represented by task node 76 in model 70. Indeed, as shown in FIG. 3, the entire subcontracted manufacturing environment may itself be represented by a model 90, which has similar structure to that of model 70. That is, model 90 is a break down of task node 76, created to have the same logical semantic structure between task nodes and state nodes as in model 70. Because model 90 uses the same directed graph approach, should the manufacturer who relies upon model 70 to assist in scheduling and other tasks (e.g., order promising, etc.) wish to identify potential bottlenecks, model 90 could be substituted for task node 76 in model 70. In such a case, the scheduler could identify problems that might not otherwise be detectable by the manufacturer. Thus, model 70 is hierarchically arranged such that any task node may be expanded to its own directed graph representation using a similar model structure.

Figure 4A:
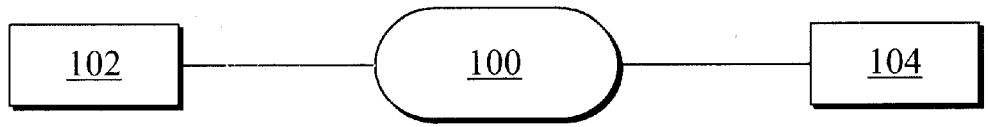
FIGS. 4A, 4B and 4C illustrate a printing process modeled by one or more task nodes according to a desired level of granularity for a model having task nodes and state nodes organized according to an embodiment of the present invention.

Task nodes may also be defined at various levels of granularity as follows. In FIG. 4A, a task node 100 represents a transformation process between state nodes 102 and 104. Returning to the print shop metaphor discussed above, task node 100 may represent a document printing process employing any printer and any printer operator. At this level of granularity, the process represented by task node 100 is very coarse, in that the print shop owner is concerned only with the document printing process and not individual printing machines/operators.

Figure 4B:
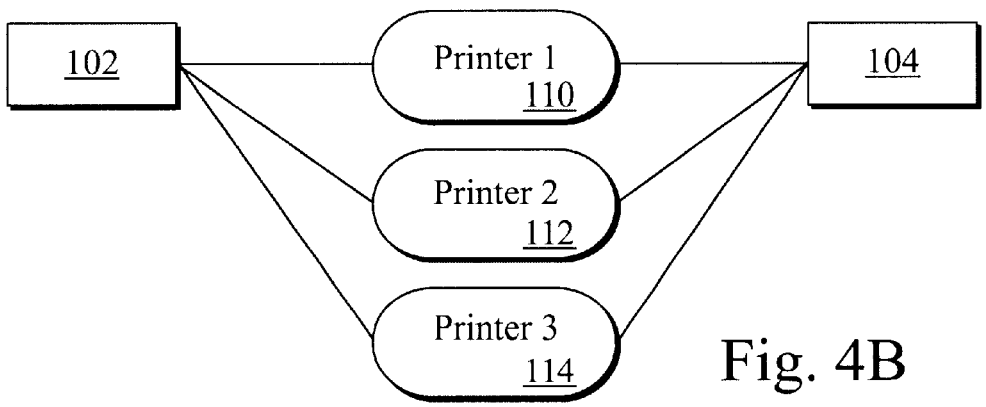

FIG. 4B now illustrates the same document printing process, however, this time task nodes 110, 112 and 114 have been used to represent the process as performed by three different document printing machines. At this level of granularity, a model that included task nodes 110, 112 and 114 would provide different routes to produce the item represented by task node 104, differentiated by printing machine, but not by individual operator.

Figure 4C:
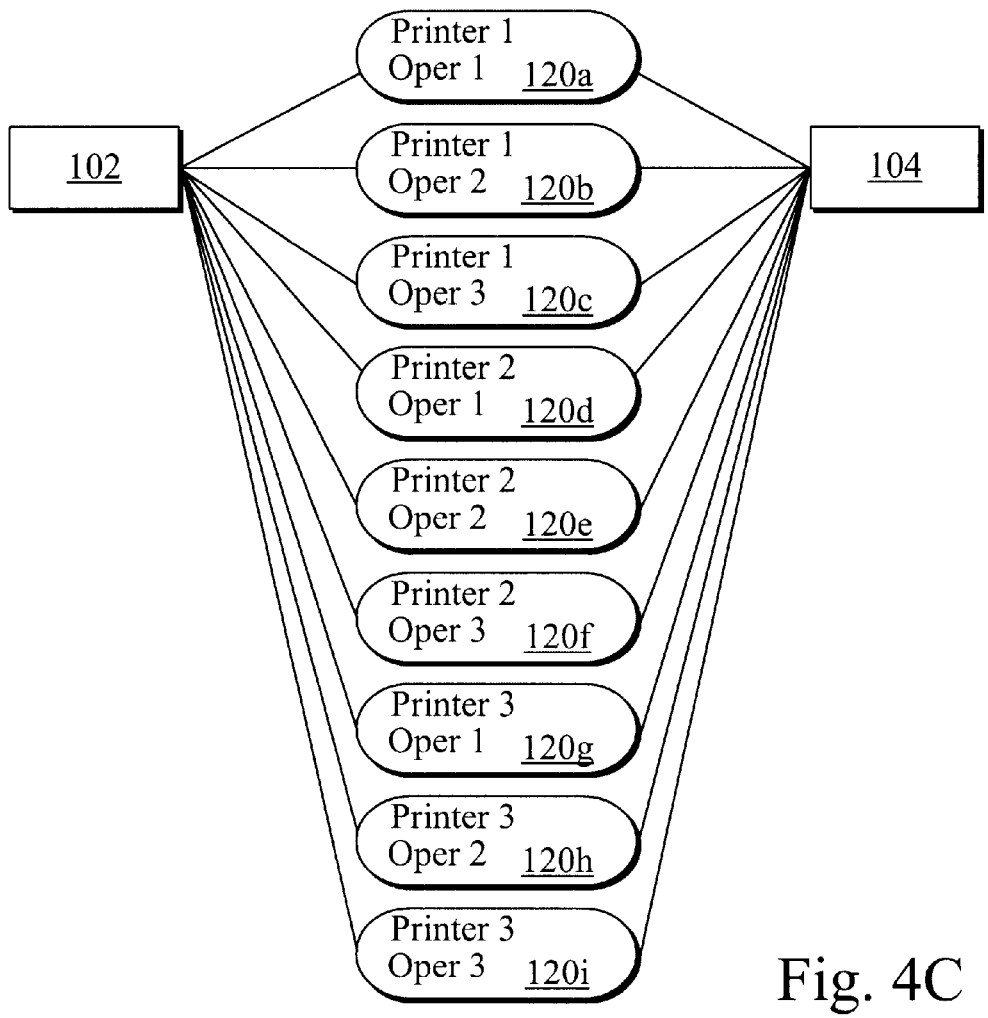

FIG. 4C illustrates the same document printing process, however, at a level of granularity that accommodates an identification of several different operators, each capable of using one or more of the possible printing machines. Task nodes 120a–120i may be included in a model where significant or important differences (e.g., in execution time, capacity, etc.) between operators and/or printing machines is important. Thus, including such detail provides an associated scheduler with multiple possible routes for scheduling production processes. Notice that any of thee or other levels of detail may be accommodated in a model of the manufacturing environment of interest without deviating form the overall structure of the directed graph discussed above.

Similar to the manner in which task nodes may be employed at various levels of granularity, state nodes may also be used to represent any desired inventory item in the production process of the manufacturing environment being modeled. Thus, entire subassemblies may be represented in some cases, while in other cases lesser items may be included. Of course, corresponding task nodes will be needed to properly represent the processes used to produce the items represented by the state nodes.

Figure 5:
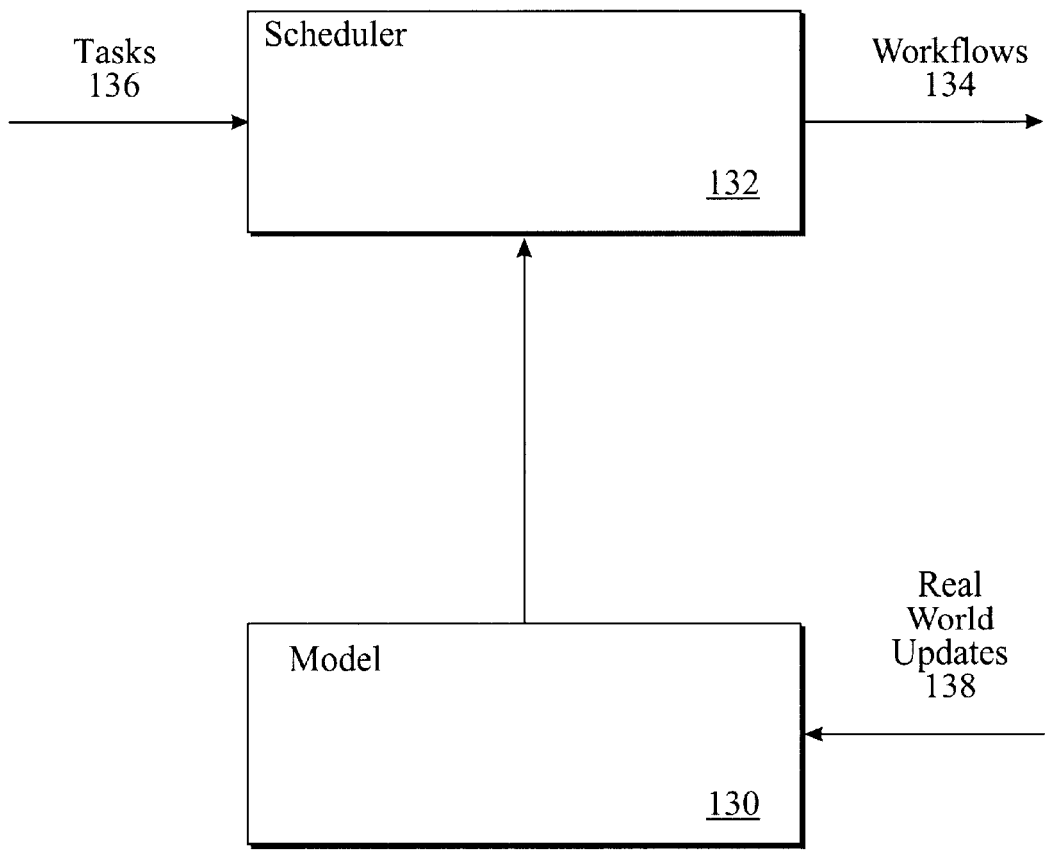
FIG. 5 illustrates an example of a scheduling system employing a model having task nodes and state nodes organized according to an embodiment of the present invention.

FIG. 5 illustrates one example of how a scheduler may make use of a model configured in accordance with the teachings presented herein. Note that the scheduler and the model may each be implemented in a computer system having a general-purpose processor and an accompanying memory and input/output system. The scheduler, for example, may represent executable or other code representing a series of computer-readable instructions to be executed by the processor in accordance with the discussion provided below. Similarly, the model may exist as a computer readable database or other file accessible by the processor (e.g., stored in memory).

Model 130 is configured as a directed graph to represent a real-world manufacturing environment as described above. Thus, model 130 includes multiple routes between alternating series of state nodes and task nodes to represent various ways in which a product may be produced. Schedule 132 is permitted to access model 130 so as to produce workflows 134 in response to tasks 136. Tasks 136 may represent orders that are being placed for processing within the manufacturing environment, carry-overs from previous orders (e.g., that were not completed during previous shifts, etc.) or other requirements. Workflows 134 represent the route through model 130 chosen by scheduler 132 for completion of individual tasks 136. That is, each workflow 138 represents a detailed set of instructions to complete a task (i.e., to produce a product called for by the associated task 136). Model 130 may be continually updated to accurately reflect the real-world manufacturing environment, which it represents. Thus, as various operators take breaks or are replaced with new workers, and/or as machines are rotated in and out of service and/or as items in a particular bill of materials are completed or delayed due to equipment failure, model 130 is updated. This allows scheduler 132 to update workflows 134 to account for the changes in the real world environment.

To produce workflows 134, scheduler 132 may determine which of the number of possible routes represented in model 130 are available to process each task 136 and may then provide work assignments accordingly. For example, scheduler 132 may determine which routes are unavailable by determining which processes represented by task nodes in model 130 are already filled to capacity and decide to schedule new tasks 136 along routes that do not include those task nodes. Of course, many other scheduling methods are known in the art and may be used to produce the workflows 134.

Thus, a model that may find application for representing a manufacturing environment has been described. Although the foregoing specification and accompanying figures discuss and illustrate specific embodiments, it should be appreciated that the present invention is to be measured only in terms of the claims that follow.

What is claimed is:

1. A directed graph, comprising:
    a first number of state nodes, at least some of which comprise virtual representations of inventory items of a manufacturing environment; and
    a second number of task nodes interconnected with the state nodes to define one or more paths through the directed graph, each of the paths comprising an alternating series of one or more of the state nodes and one or more of the task nodes with any predecessor state node in one of the paths representing a precondition for a subsequent task node along the one of the paths and any following state node of the subsequent task node along the one of the paths representing a result of applying one or more actions that correspond to that task node.

2. The directed graph of claim 1 wherein all the state nodes comprise virtual representations of inventory items of a manufacturing environment.

3. The directed graph of claim 1 wherein at least a subset of the first number of state nodes as arranged in the hierarchy defined by the directed graph collectively define a bill of materials for the manufacturing environment.

4. The directed graph of claim 3 wherein the subset of the first number of state nodes define a route through the directed graph.

5. The directed graph of claim 3 wherein each of the second number of task nodes defines a virtual representation of a manufacturing process.

6. The directed graph of claim 3 wherein the second number of task nodes collectively define routings for the manufacturing environment.

7. The directed graph of claim 5 wherein individual ones of the routings define bills of resources for the manufacturing environment.

8. The directed graph of claim 3 wherein the second number of task nodes collectively define a group of reusable resources for the manufacturing environment.

9. A method of modeling a manufacturing environment, comprising:
    representing a final product of the manufacturing process with a first state node of a directed graph; and
    representing each of one or more manufacturing processes required in the production of the final product and the corresponding preconditions thereto and results produced thereby as a number of corresponding task nodes and state nodes, the task nodes representing the manufacturing processes of the manufacturing environment and the state nodes, at least some of which represent inventory items of a manufacturing environment, representing the preconditions thereto and the results produced thereby, the task nodes and state nodes arranged within the directed graph such that inputs to each of the task nodes represent required states therefor and outputs of each of the task nodes represent alternative states produced thereby, the first state node representing the output of one or more of the manufacturing processes represented by one or more of the task nodes.

10. The method of claim 9 wherein the task nodes represent processes associated with reusable resources for the manufacturing environment.

11. The method of claim 9 wherein the task nodes represent manufacturing processes that use reusable resources and consumable resources from the manufacturing environment.

12. The method of claim 9 wherein the state nodes are arranged in a hierarchy defined by the directed graph so as to comprise one or more bills of material for the manufacturing environment.

13. The method of claim 12 wherein task nodes alternate with state nodes along each of a number of routes through the directed graph, each path defining a way in which the final product may be produced in t he manufacturing environment.

14. A computer assisted scheduling system, comprising:
    a model of a real-world manufacturing environment arranged as a direct graph and including a first number of state nodes, at least some of which represent inventory items of the manufacturing environment, and a second number of task nodes interconnected with the state nodes to define one or more paths through the directed graph, each of the paths comprising an alternating series of one or more of the state nodes and one or more of the task nodes with any predecessor state node in one of the paths representing a precondition for a subsequent task node along the one of the paths and any following state node of the subsequent task node along the one of the paths representing a result of applying one or more actions that correspond to that task node; and
    a scheduler configured to determine which of the paths through the direct graph to provide as a workflow in response to a tasking for the manufacturing environment.

15. The system of claim 14 further comprising means for receiving updates from the real-world manufacturing environment, the updates representing changes in the manufacturing environment.

16. The system of claim 15 wherein the changes comprise completed tasks.

17. The system of claim 15 wherein the changes comprise a change in the availability of one or more resources associated with one or more of the task nodes.

* * * * *